US006323621B1

(12) United States Patent
Jacobs

(10) Patent No.: US 6,323,621 B1
(45) Date of Patent: Nov. 27, 2001

(54) BATTERY LEAD WITH CHARGING AND OPERATING CONNECTION

(75) Inventor: James K. Jacobs, Toronto (CA)

(73) Assignee: Electrofuel, Inc., Mississauga ( * ) Notice: Subject to any disclaimer, the term of this patent is extended or adjusted under 35 U.S.C. 154(b) by 0 days.

(21) Appl. No.: 09/703,673

(22) Filed: Nov. 2, 2000

(51) Int. Cl.[7] ........................ H02J 7/00
(52) U.S. Cl. ........................ 320/119; 439/502
(58) Field of Search ........................ 439/502, 504, 439/627, 638; 320/111, 112, 119

(56) References Cited

U.S. PATENT DOCUMENTS

| | | | | |
|---|---|---|---|---|
| 5,071,367 | * | 12/1991 | Luu | 439/502 |
| 5,417,593 | | 5/1995 | Suzuki et al. | 439/651 |
| 5,511,995 | | 4/1996 | Cheng | 439/638 |
| 5,666,006 | | 9/1997 | Townsley et al. | 320/124 |
| 5,818,200 | | 10/1998 | Cummings et al. | 320/116 |
| 5,900,684 | * | 5/1999 | Lam | 439/638 |
| 5,955,797 | | 9/1999 | Kim | 307/66 |
| 5,955,867 | | 9/1999 | Cummings et al. | 320/107 |
| 5,976,720 | | 11/1999 | St. Jean et al. | 429/7 |
| 6,057,776 | * | 5/2000 | Sargent | 340/644 |
| 6,190,199 | * | 2/2001 | Bump et al. | 439/540.1 |
| 6,196,877 | * | 3/2001 | Murakami et al. | 439/638 |
| 6,200,159 | * | 3/2001 | Chou | 439/535 |

FOREIGN PATENT DOCUMENTS

| | | |
|---|---|---|
| 0854550 | 7/1998 | (EP) . |
| 2334155 | 8/1999 | (GB) . |

* cited by examiner

*Primary Examiner*—Peter S. Wong
*Assistant Examiner*—Pia Tibbits
(74) *Attorney, Agent, or Firm*—Riches, McKenzie & Herbert LLP; Jeffrey Pervanas

(57) ABSTRACT

An electrical lead for simultaneously connecting an external power source to an electrical load and an external battery is disclosed. The electrical lead has preferably a double connector comprising a socket part axially aligned with a plug part at a first end of the lead. The socket part connects with a plug from an external power source and the plug part connects with an electrical load, such as a portable computer. A separate plug, located at the second end of the electrical lead, is provided for connecting to an external battery. The socket part, connectable to the external load, is electrically coupled to the plug part for connection to the electrical load and also the plug for connection to the external battery. The lead comprises a first insulated conductor electrically coupling the socket part to the plug, and, a second insulated conductor electrically coupling the plug to the plug part. In this way, the socket part is electrically coupled in parallel with the plug part. Furthermore, the internal terminals of the socket part, the plug part and the plug are electrically coupled in parallel. Likewise, the external terminals of the socket part, the plug part and the plug are electrically coupled in parallel.

22 Claims, 4 Drawing Sheets

BATTERY LEAD WITH CHARGING AND OPERATING CONNECTION

FIELD OF THE INVENTION

The present invention relates to electrically conductive leads. In particular, the present invention relates to an electrical lead for use with a lithium ion rechargeable battery pack and an electrical load, such as a portable computer.

BACKGROUND OF THE INVENTION

Portable computers are known applications for the use of batteries. Portable computers can have internal batteries wherein the battery is integrated into the body of the portable computer, although the integrated battery may often be detachable. Also, portable computers can have external batteries where the battery is external of the body of the computer.

A portable computer is generally provided with a power-in receptacle to allow the computer to be powered from an external power source. The external power sources can be any source of power for operation of the computer and also recharging of the internal battery. Such external power sources include AC domestic outlets, a car battery outlet or any other external power source. In the case where the battery is external, the battery supplies power to the computer by means of an electrically conductive lead which connects the external battery to the power-in receptacle of the computer.

Both internal and external batteries are generally rechargeable. Internal batteries typically remain within the computer during recharging. The power needed to recharge the internal battery enters through the computer power-in receptacle which is also occasionally referred to as the computer power input receptacle.

External batteries can be recharged by means of an electrical lead extending from the external battery to the external power source, generally through an adapter. The external batteries may comprise an individual battery or a combination of batteries in a battery pack. While any type of external battery can be used, rechargeable lithium batteries are often used in electronic devices requiring a steady and reliable source of electrical energy. The essential components of a rechargeable lithium battery are an anode or negative electrode, a cathode or positive electrode and a lithium ion conducting non-aqueous electrolyte. The anode active component of a rechargeable lithium battery is a substance which is capable of inserting or intercalating lithium ions when the battery is charged and releasing lithium ions when the battery is discharged. The cathode active component of a rechargeable lithium battery is capable of incorporating lithium ions reversibly, whereby the lithium ions are released when the battery is charged and are reincorporated in the cathode active component on discharge. The electrolyte of a rechargeable lithium battery is usually a non-aqueous electrolyte, most commonly a solid or liquid polymer bearing a lithium compound having dissociable lithium ions, or a microporous polymer which has been impregnated with an organic liquid having a lithium salt dissolved therein, or any non-aqueous substance that is capable of conducting electricity by means of movement of lithium ions. The cathode active component is commonly a lithium containing chalcogenide, most frequently a lithium containing transition metal oxide.

It is apparent that by having an electrical load, such as a portable computer, powered by means of two sources, either external power sources or batteries, the user has a great deal of flexibility as to use of the electrical load. In the case where the electrical load is a portable computer, this combination of batteries and external power sources provides great flexibility to power the portable computer. For example, the portable computer may be powered by means of the external power source in an office environment where an external power source, such as an electrical wall outlet, is available. At this time, it may also be convenient to charge the internal battery so that it will be fully charged and available for further use. However, when an external power source is unavailable or inconvenient, an external battery pack may be used to power the portable computer.

It is known for portable computers to have more than one rechargeable battery in order to provide an extended mobile operating time to the computer. U.S. Pat. No. 5,818,200 teaches a dual smart battery detection system for portable computers where only one of two internal battery packs is charged or discharged at any one time. U.S. Pat. No. 5,955,867 teaches dual battery pack charging in a computer system where simultaneous recharging of both battery packs can occur once each battery pack has reached a predetermined charge level. U.S. Pat. No. 5,666,066 teaches sequential charging and discharging of batteries located within a computer. U.S. Pat. No. 5,976,720 discloses a battery pack with circuitry that protects the components from damage due to shorting and/or thermal overload.

However, in situations where only a single AC adapter is available, which is the common situation, it has not been possible in the past to recharge the external battery pack while simultaneously operating the electrical load, such as the portable computer. Similarly, in cases where the electrical load has an internal battery, it has not been possible to charge both the external battery pack as well as the internal battery with a single AC adapter. This has been the case, in part, because the voltage supplied by the AC adapter from an external power source will typically be matched to the voltage needed by the computer. The voltage needed by the computer is often higher than that suitable for charging the external battery. This has effectively prevented simultaneously supplying power from an external power source to both the external battery and the computer, either to operate the computer or charge the internal battery.

Accordingly, there is a need in the art for a device and method to simultaneously provide power from an external power source to both an external battery and an electrical load, such as a portable computer. In addition, there is a need in the art for a device and method to permit simultaneously charging an external battery pack and a battery pack internal to a personal computer from a single AC adapter.

SUMMARY OF THE INVENTION

Accordingly, it is an object of this invention to at least partially overcome the disadvantages of the prior art. Also, it is an object of this invention to provide an improved device and method for permitting simultaneous charging of an external battery pack and operation of an electrical load, such as a personal computer, from a single external power source, whether or not an AC adapter or other intermediary device is used. It is also an object of this invention to provide an improved device and method which permits simultaneous charging of an external battery pack and a battery pack internal to an electrical load, such as a personal computer, from a single external power source.

Accordingly, in one of its aspects, the present invention resides in an electrical lead for connecting an external power source to an electrical load and a battery external to the electrical load, said electrical lead comprising: a first connection for electrically connecting the lead to the electrical power source; a second connection for electrically connecting the lead to the battery; a third connection for electrically connecting the lead to the electrical load; and wherein the first connection is electrically coupled to the second connection and the third connection permitting the external power source to simultaneously supply power to the battery and the electrical load.

In a further aspect, the present invention resides in a method of simultaneously charging an electrical load and a battery external to the electrical load, said method comprising the steps of: (a) connecting a first connection of a lead to an external power source; (b) connecting a second connection of the lead to the external battery; (c) connecting a third connection of the lead to the electrical load; and wherein the first connection is electrically coupled to the second connection and the third connection in parallel.

Accordingly, the present invention relates to a lead for both supplying power to an electrical load and charging an external battery pack. In one embodiment, the lead has an insulated flexible conductor bundle with first and second opposite ends, and preferably a first double connector electrically connected to the first end. The double connector has a first plug part receivable in a power input receptacle of a portable computer. The double connector further has a socket part for receiving a charger plug. The second end of the lead is connected to the external lithium ion battery pack. In one embodiment, the second end is provided with a second plug receivable in a receptacle of the external battery which is preferably an external lithium ion battery pack. The first plug part, socket part, insulated flexible conductor bundle and optionally the second plug are electrically coupled together. In this way, an external power source, such as a charger or an AC adapter connected to an external source of power, such as a wall outlet or a car battery outlet, can be connected to the electrical load, such as a portable computer, as well as an external battery pack. In the case where the electrical load, such as the portable computer, also contains an internally rechargeable battery or batteries, the connection to the electrical load may also connect the external power source to the internal rechargeable battery or batteries.

In one embodiment, the lead comprises an insulated flexible conductor bundle having two insulated electrical leads for connection to the plugs and sockets. In another embodiment, the insulated flexible conductor bundle comprises a third lead for decreasing electrical noise and providing safety shielding. It is understood that the lead may contain additional conductors and other components for control, communications, strength and other purposes. It will be further understood by those of skill in the art that the aforementioned plugs may be interchangeably replaced with sockets and receptacles and vice versa, maintaining mating compatibility without departing from the scope of the present invention.

One advantage of the present invention is that a single connection to an external power source, such as a wall outlet through an AC adapter, can be used to both power the electrical load, such as a personal computer, as well as charge an external battery pack. A further advantage of the present invention is that if the electrical load, such as the portable computer, comprises an internal battery pack, the present invention provides a device and method for charging both the external battery pack and the internal battery pack simultaneously.

A further advantage of the present invention is that the connection to the external battery pack is connected in parallel with the third connection to the electrical load. In this way, if no external battery pack is present, the lead may still be used to supply power to the electrical load. Likewise, if it is not necessary to supply power to the electrical load, either for its operation or to charge internal batteries, the electrical lead may still be used to charge the external battery pack, as the connection to the external battery pack and the electrical load is in parallel.

DETAILED DESCRIPTION OF THE INVENTION

Figure 1A:
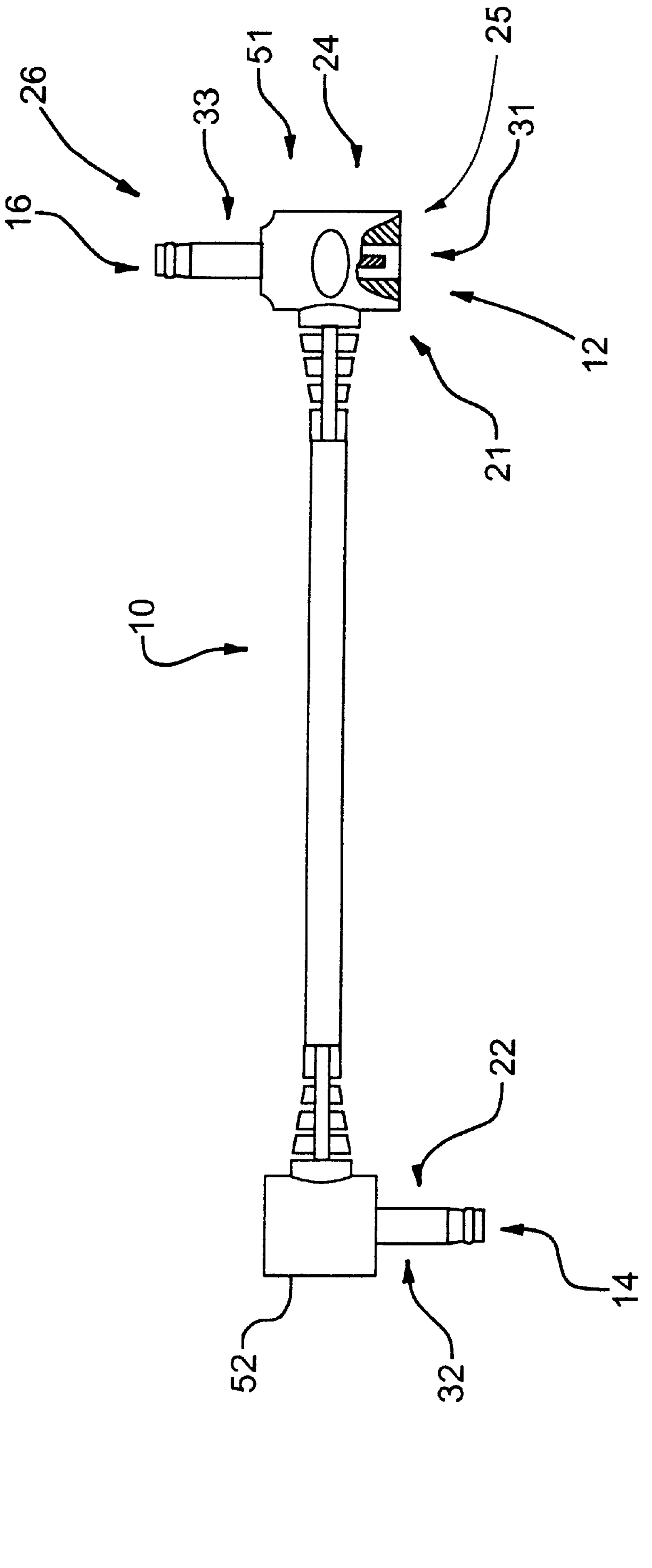
FIG. 1A is a diagram showing a lead according to one embodiment of the present invention.

FIG. 1A shows a lead, shown generally by reference numeral 10, according to one embodiment of the present invention. As illustrated in FIG. 1A, the lead 10 has a first end 21 and a second end 22 generally opposite the first end 21. The distance from the first end 21 to the second end 22 is generally more than two centimeters and less than 300 centimeters. Preferably, the length from the first end 21 to the second end 22 is about 30 centimeters.

The lead 10 comprises a first connection 12, a second connection 14 and a third connection 16. As illustrated in FIG. 1A, the first connection 12 and the third connection 16 are preferably located at the first end 21 and the second connection 14 is preferably located at the second end 22.

In one embodiment, the first connection 12 comprises a socket or jack 31, the second connection 14 comprises a first plug 32 and the third connection 16 comprises a second plug 33. Preferably, the first end 21 has a double connector, shown generally by reference numeral 24. The double connector 24 comprises a socket part 25 axially aligned with a plug part 26. In this preferred embodiment, the socket part 25 of the double connector 24 acts as the socket 31 and forms the first connection 12. Furthermore, in this preferred embodiment, the plug part 26 acts as the second plug 33 and forms the third connection 16.

Figure 1B:
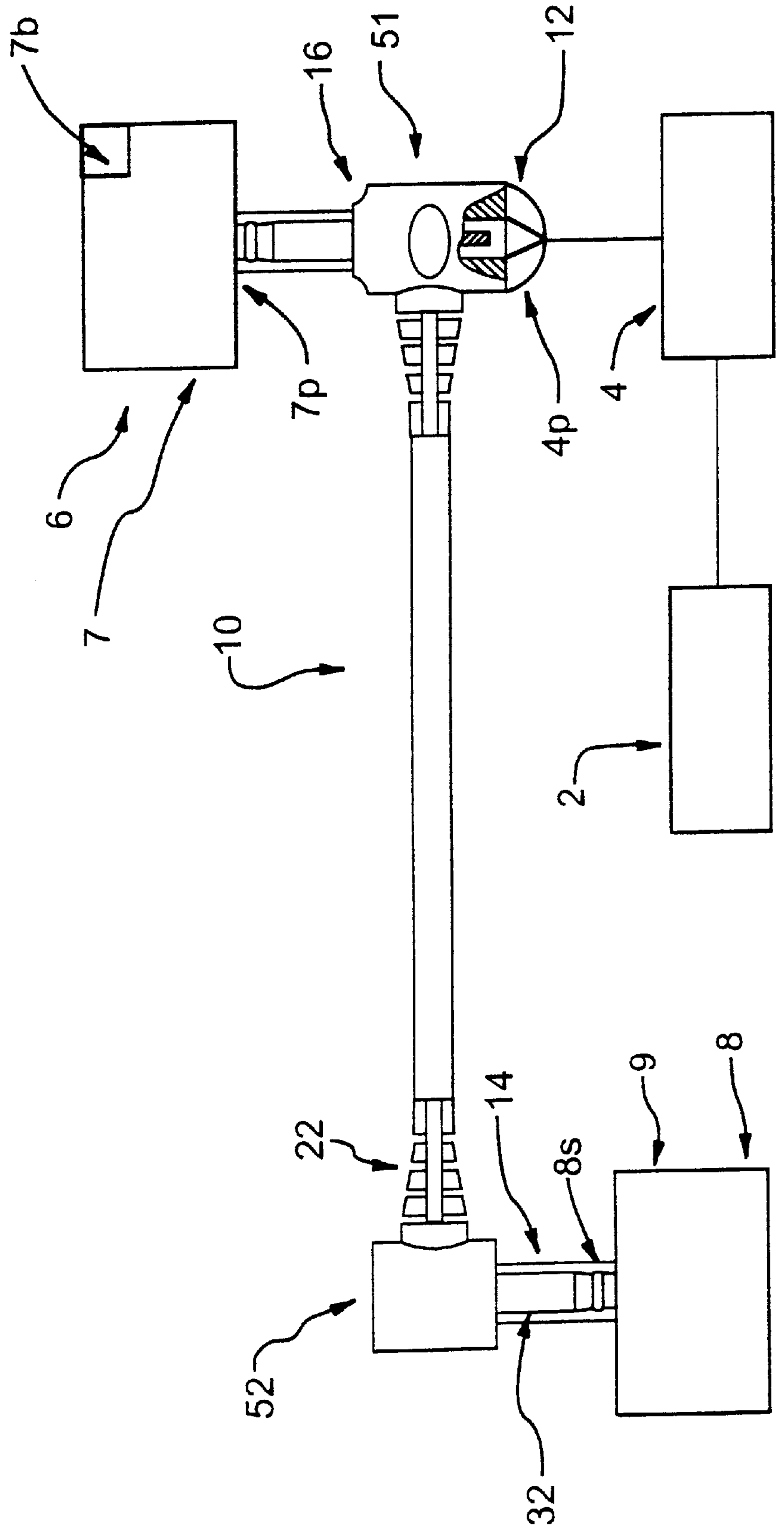
FIG. 1B is a diagram showing the lead illustrated in FIG. 1A connected to an external power source, an electrical load and an external battery.

The first connection 12 generally releasably electrically connects the lead 10 to an external power source, shown by reference numeral 2 in FIG. 1B. The external power source 2 can be any type of external power source, such as a wall receptacle, or a connection to a car battery.

In either case, an adapter 4 will generally be required to adapt or modify the power from the external power source 2 to a form which can be used. For example, if the external power source 2 is an alternating current (AC) power source of about 120V, as is the standard in North America, or 220V as is the standard in other countries of the world, the adapter 4 may comprise a transformer for decreasing the voltage to a lower voltage, such as between 10V and 20V, as well as a rectifier for converting the alternating current into a direct current (DC), which may be used by most electrical loads. As illustrated generally in FIG. 1, the adapter 4 may comprise a plug 4*p* for mating with the first connection 12. In the embodiment where the first connection 12 comprises a socket part 25 of a double connector 24, the electrical connection from an external power source 2 through the adapter 4 will be made by means of the plug 4*p*.

The third connection 16 releasably electrically connects the lead 10 to an electrical load, shown generally by reference numeral 6, in FIG. 1B. The electrical load 6, in a preferred embodiment, is a portable computer 7. The portable computer 7 may also comprise an internal battery, shown generally by reference numeral 7*b*. In the embodiment where the electrical load 6 is a portable computer 7, the third connection 16 will generally comprise the plug part 26 of the double connector 24 and be inserted into the power input receptacle of the portable computer 7.

As illustrated in FIG. 1B, the second connection 14 is releasably electrically connectable to an external battery 8. When the second connection 14 has a first plug 32, the external battery 8 may have a socket 8s for mating with the first plug 32.

In a preferred embodiment, the battery 8 is a lithium ion battery shown by reference numeral 9. The lithium ion battery 9 generally can be charged at the same voltage as necessary for operation of a portable computer 7. In this way, the current and voltage supplied by the adapter 4 can be used both to power the portable computer 7 and to charge the lithium ion battery 9. Furthermore, if the portable computer 7 comprises an internal battery 7*b*, the current and voltage supplied by the adapter 4 can be used to power the portable computer 7 and/or charge the internal battery 7*b*, as well as charge the lithium ion battery 9. The external battery 8 may be a single lithium ion battery or lithium ion battery pack (both shown by reference numeral 9) comprising more than one individual battery.

In some cases, should the battery or battery pack (collectively referred to by reference numeral 8) not be able to operate at the same voltage as the portable computer 7, the lead 10 may comprise modification circuitry (not shown) to modify the voltage and current of the power being received through the adapter 4. It is understood that, preferably, the adapter 4 should be configured to supply power at the requirements of the portable computer 7, as the portable computer 7 will generally be more costly and have more sensitive circuitry. However, the adapter 4 may also be configured to supply power to meet the requirements of the external battery 8, in which case modification circuitry (not shown) may be required to modify the voltage and current for the portable computer 7. The modification circuitry (not shown) for the portable computer 7 may be located in the lead 10 or within the portable computer 7.

It is understood that the first connection 12, the second connection 14 and the third connection 16 are releasably electrically connectable to the external power source 2, the external battery pack 8 and the electrical load 6, respectively. While FIGS. 1A and 1B illustrate the first second and third connection as comprising a socket part 25, a first plug 32 and a plug part 26, the invention is not limited to these types of specific electrical connections. Rather, it is understood that the first connection 12, the second connection 14 and the third connection 16 will comprise any type of specific connections required to compatibly mate and form an electrical connection with the corresponding power source 2, electrical load 8 and external battery 6. Furthermore, it is understood that if the lead 10 is manufactured with a specific type of electrical connection which does not compatibly mate, a suitable adapter may be added as is known in the art.

Figure 2A:
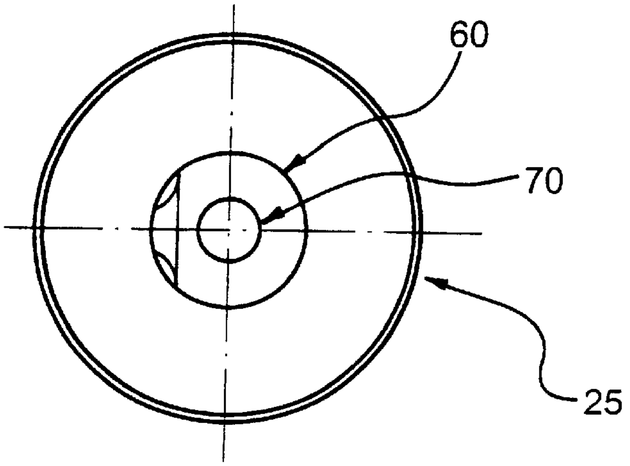
FIG. 2A is a connection of the lead to an external power source according to one embodiment of the present invention.
Figure 2B:
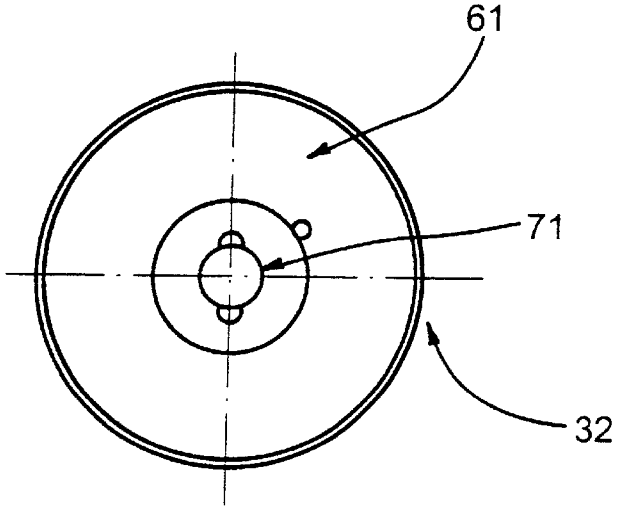
FIG. 2B is a connection of the lead to a battery according to one embodiment of the present invention.
Figure 2C:
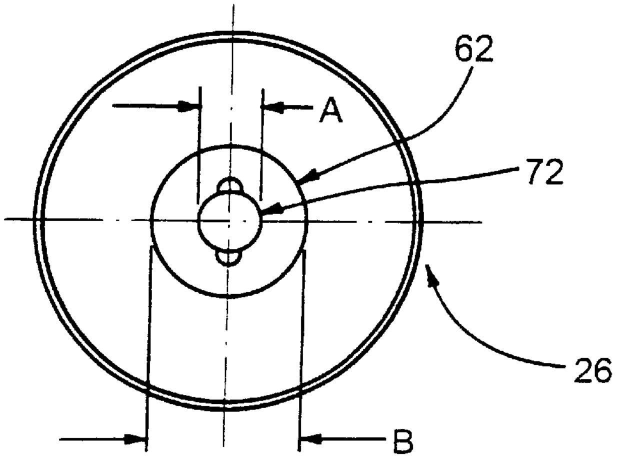
FIG. 2C is a drawing illustrating a connection from the lead to an electrical load.

As stated above, FIGS. 1A and 1B illustrate the preferred embodiment where the first connection 12, the second connection 14 and the third connection 16 comprise the socket part 25, first plug 32 and plug part 26. These elements are also illustrated in FIGS. 2A, 2B and 2C. For example, FIG. 2A illustrates the front view of the socket part 25. The socket part 25 generally comprises an internal terminal 70, such as a pin, and an external terminal 60, such as a clip, electrically insulated from the internal terminal 70. The outer circumference of the socket part 25 generally has a diameter of about 10 to 15 millimeters.

As illustrated in FIG. 2C, the plug part 26 of the third connection 16 comprises an internal terminal 72 and an external terminal 62 electrically insulated from the internal terminal 72. The inside diameter of the internal terminal 72, shown by letter A in FIG. 2C, will be about one to two millimeters and compatibly mate with the power input receptacle of a computer 7. Preferably, the outside diameter of the external terminal 62, shown by letter B. will be about three to four millimeters and the first plug 32 will extend about eight millimeters from the first molded body 51 (shown in FIG. 1A) at the first end 31 which forms, in a preferred embodiment, the double connector 24. It is noted that these dimensions are not critical, but rather dictated by convenience.

FIG. 2B illustrates the front view of the first plug 32. The plug part 26 will extend from the second molded body 52 at the second end 22. The first plug 32 may comprise an internal terminal 71 and an external terminal 61 insulated from the internal terminal 71 to compatibly mate with an external battery 8 such as a rechargeable lithium ion battery 9.

Figure 3:
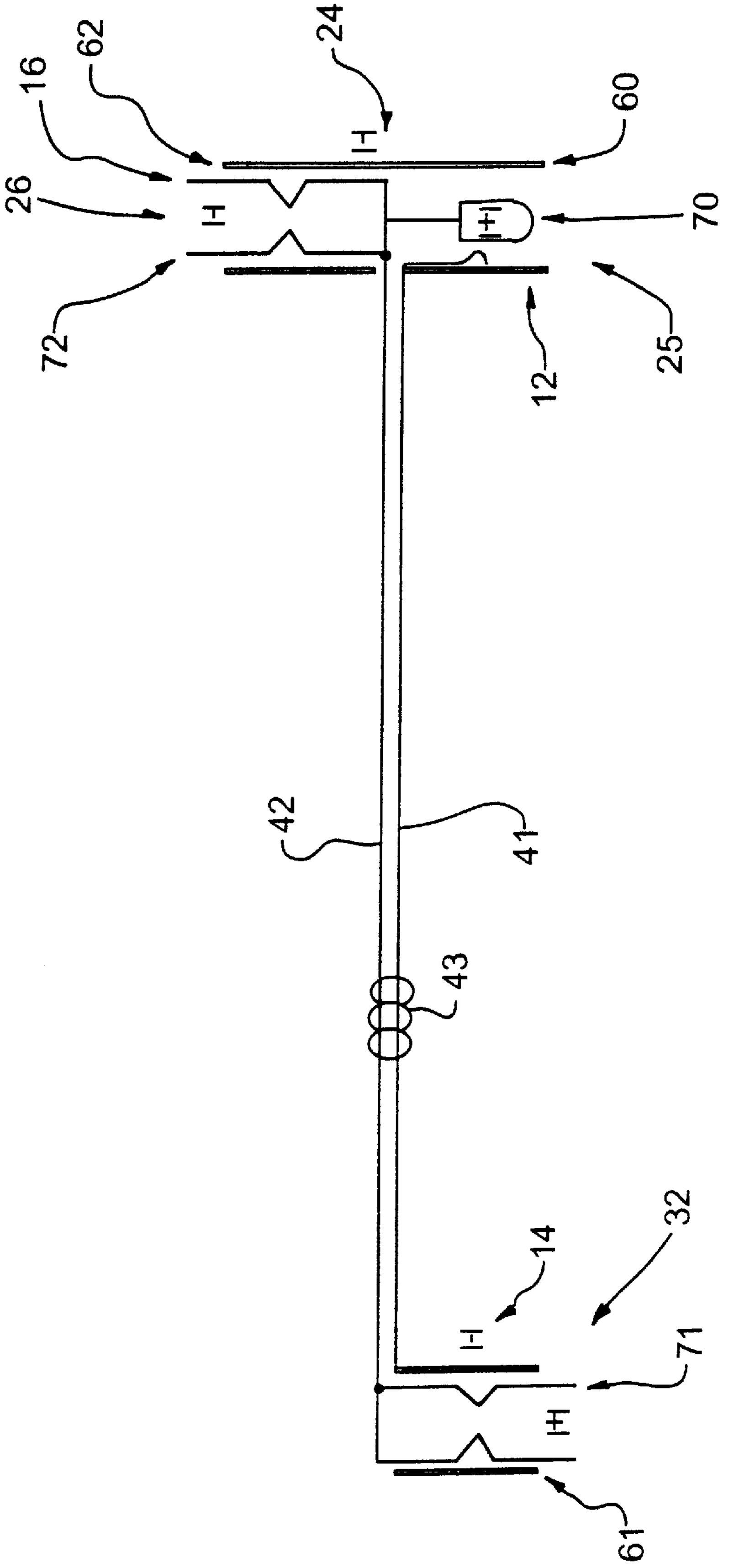
FIG. 3 is a wiring diagram showing the internal wiring of the lead according to one embodiment of the present invention.

FIG. 3 illustrates a wiring diagram for the lead 10 according to one preferred embodiment of the invention. As illustrated in FIG. 3, the internal terminal 70 of the socket part 25 is electrically coupled to the internal terminal 72 of the plug part 26. Likewise, as shown in FIG. 3, the external terminal 60 of the socket part 25 is electrically coupled to the external terminal 62 of the plug part 26.

In this way, the electrical current entering through the socket part 25 from the external power source 2 will be electrically coupled through the double connector 24 to the terminals 62, 72 of the plug part 26. In a preferred embodiment, as illustrated in FIGS. 1A, 1B and 3, the external and internal terminals 60, 70 of the socket part 25 are integrally formed with the external and internal terminals 62, 72 of the plug part 26 with the double connector 24 and are thereby electrically coupled.

As illustrated in FIG. 3, a first insulated conductor 41 electrically couples the first connection 12, comprising the socket part 25 in this embodiment, to the second connection 14, comprising the first plug 32 in this embodiment. As also illustrated in FIG. 3, the first insulated conductor 41 electrically couples the outer terminal 60 of the socket part 25 with the outer terminal 61 of the first plug 32. In a similar manner, a second insulated conductor 42 electrically couples the second connection 14 with the third connection 16, such as by electrically coupling the internal terminal 71 of the second plug 33 with the internal terminal 72 of the plug part 26. In this way, the first connection 12 is electrically coupled to the second connection 14 and the third connection 16 in parallel. Furthermore, in this way, the external terminals 60, 61 and 62 of each of the first connection 12, the second connection 14 and the third connection 16 are electrically coupled together. Furthermore, the internal terminals 70, 71 and 72 of the first connection 12, the second connection 14 and the third connection 16 are also electrically coupled together.

In this way, the lead 10 comprises a first connection 12 which is electrically coupled in parallel to the second connection 14 and the third connection 16. This permits the external power source 2 to simultaneously supply power to both the external battery pack 8 and the electrical load 6. This also permits the lead 10 to be used to supply power to only the external battery pack 8, if no electrical load 6 is connected to the second connection 14, and to supply power only to the electrical load 6 if no external battery pack 8 is connected to the third connection 16.

In a further preferred embodiment, the lead 10 comprises a third conductor 43. The third conductor 43 is a shield or ground conductor, shown partially around the lead 10 in FIG. 3. The third conductor 43 may be provided to decrease electrical noise and for safety shielding. It is understood that the third conductor 43, if present, will extend across the entire lead 10. Furthermore, if molded bodies 51, 52 have shielding or grounding features, the third conductor 43 may be electrically coupled to the shielding or grounding features.

The present invention also relates to the method of simultaneously powering the electrical load 6, which in preferred embodiment is the computer 7, and also charging the external battery 8, which in a preferred embodiment is a lithium ion battery 9. The method comprises the steps of connecting the first connection 12 to the external power source 2, such as through the plug 4*p* of an adapter 4. The method also comprises the step of connecting the second connection 14 of the lead 10 to the external battery 8, and, connecting the third connection 16 of the lead 10 to the electrical load 6. In this way, because the first connection 12 is electrically coupled in parallel to the second connection 14 and the third connection 16, as described above, power from the external power source 2 can be supplied simultaneously to power the electrical load 6 and also charge the external battery 8.

It is understood that while the invention has been described in terms of the socket 25, first and second plugs 32, 33 and the double connector 24 having socket and plug parts 25, 26, the invention is not limited to these types of releasable connectors. Rather, the present invention includes all types of connectors to releasably connect and compatibly mate with the corresponding parts, namely the external power source 2, the external battery pack 8 and the electrical load 6. It is also understood that while the present invention has been described in terms of a lead 10 having releasable connectors, such as socket 31 and plugs 32, 33, the present invention includes leads which may be permanently connected or wired to one or more of the external power source 2, the battery pack 8 and the electrical load 6. It is also understood that the present invention can operate with both individual batteries 8 and lithium ion batteries 9, as well as battery packs 8 and lithium ion battery packs 9.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. An electrical lead for connecting an external power source to an electrical load and a battery external to the electrical load, said electrical lead comprising:

a first connection for electrically connecting the lead to the electrical power source;

a second connection for electrically connecting the lead to the battery, said first connection being electrically connected to the second connection;

a third connection for electrically connecting the lead to the electrical load, said second connection being electrically connected to the third connection; and wherein the first connection is also electrically coupled to the third connection permitting the external power source to simultaneously supply power to the battery and the electrical load.

2. The electrical lead as recited in claim 1 wherein the electrical lead has a first end and a second end opposite the first end; and wherein the first connection and the third connection are located at the first end and the second connection is located at the second end.

3. The electrical lead as recited in claim 1 further comprising a double connector comprising a socket part axially aligned with a plug part; and wherein the socket part forms the first connection and connects with a plug from an external power source and the plug part forms the third connection and connects with a socket in the electrical load.

4. The electrical lead as recited in claim 1 wherein the electrical load is a portable computer having a power-in receptacle which mates with the third connection; and wherein the third connection comprises a plug for releasably connecting the lead to the power input receptacle of the portable computer.

5. The electrical lead as recited in claim 4 wherein the first connection comprises a socket for releasably connecting the lead to the external power source and the second connection comprises a plug for releasably connecting the lead to the battery.

6. The electrical lead as recited in claim 5 wherein the battery is a lithium ion battery.

7. The electrical lead as recited in claim 1 further comprising:

a first insulated conductor electrically coupling the first connection to the second connection;

a second insulated conductor electrically coupling the second connection to the third connection; and wherein the first connection is proximate the third connection and electrically coupled thereto such that the first connection is electrically coupled to the second connection and the third connection in parallel.

8. The electrical lead as recited in claim 7 wherein the electrical lead has a first end and a second end opposite the first end; and wherein the first connection and the third connection are located at the first end and the second connection is located at the second end.

9. The electrical lead as recited in claim 8 further comprising a third insulated conductor extending from the first end to the second end for shielding the electrical lead.

10. The electrical lead as recited in claim 9 wherein the lead has a length from the first end to the second end of more than 2 centimeters and less than 300 centimeters.

11. The electrical lead as recited in claim 1 wherein the first connection, the second connection and the third connection each comprise an internal terminal and an external terminal; and wherein the internal terminal of each of the first connection, the second connection and the third connection are electrically coupled together and the external terminal of each of the first connection, the second connection and the third connection are electrically coupled together.

12. The electrical lead as recited in claim 11 wherein the external terminals of the first connection and the third connection are integrally formed and thereby electrically coupled together.

13. The electrical lead as recited in claim 1 wherein the battery is a lithium ion battery; and wherein the second connection is connected to the lithium ion battery.

14. A method of simultaneously charging an electrical load and a battery external to the electrical load, said method comprising the steps of:

a) connecting a first connection of a lead to an external power source;

b) connecting a second connection of the lead to the external battery, said first connection being electrically connected to the second connection;

c) connecting a third connection of the lead to the electrical load, said second connection being electrically connected to the third connection; and wherein the first connection is also electrically coupled to the third connection permitting the external power source to simultaneously supply power to the battery and the electrical load.

15. The method as recited in claim 14 wherein the electrical lead has a first end and a second end opposite the first end; and wherein the first connection and the third connection are located at the first end and the second connection is located at the second end.

16. The method as recited in claim 14 wherein the lead comprises a double connector having a socket part axially aligned with a plug part and the method further comprises the steps of:

a1) connecting the first connection to the external power source by connecting the socket part to a plug from the external power source; and c1) connecting the third connection to the electrical load by connecting the plug part with a socket in the electrical load.

17. The method as recited in claim 14 wherein the electrical load is a portable computer having a power-in receptacle.

18. The method as recited in claim 14 wherein the third connection comprises a plug for releasably connecting the lead to the power input receptacle of the portable computer.

19. The method as recited in claim 18 wherein the first connection comprises a socket for releasably connecting the lead to the external power source and the second connection comprises a plug for releasably connecting the lead to the battery.

20. The method as recited in claim 19 wherein the battery is a lithium ion battery.

21. The method as recited in claim 14 wherein the electrical lead comprises a first insulated conductor electrically coupling the first connection to the second connection and a second insulated conductor electrically coupling the second connection to the third connection; and wherein the first connection is electrically coupled to the third connection such that the first connection is electrically coupled to the second connection and the third connection in parallel.

22. The method as recited in claim 21 wherein the electrical lead has a first end and a second end opposite the first end;

wherein the first and third connections are located at the first end and the second connection is located at the second end; and wherein the electrical lead comprises a third insulated conductor extending from the first end to the second end for shielding the electrical lead.

* * * * *